US010063045B2

(12) United States Patent
Gemme et al.

(10) Patent No.: US 10,063,045 B2
(45) Date of Patent: Aug. 28, 2018

(54) COIL ACTUATOR A FOR LOW AND MEDIUM VOLTAGE SWITCHING APPARATUS AND AN ARC FAULT COIL SUPPRESSION DEVICE COMPRISING SAID COIL ACTUATOR

(71) Applicant: ABB Technology AG, Zurich (CH)

(72) Inventors: Carlo Gemme, Pavia (IT); Gabriele Valentino De Natale, Milan (IT)

(73) Assignee: ABB TECHNOLOGY AG, Zurich (CH)

( * ) Notice: Subject to any disclaimer, the term of this patent is extended or adjusted under 35 U.S.C. 154(b) by 298 days.

(21) Appl. No.: 14/892,738

(22) PCT Filed: May 8, 2014

(86) PCT No.: PCT/EP2014/059495
§ 371 (c)(1),
(2) Date: Nov. 20, 2015

(87) PCT Pub. No.: WO2014/187678
PCT Pub. Date: Nov. 27, 2014

(65) Prior Publication Data
US 2016/0118783 A1 Apr. 28, 2016

(30) Foreign Application Priority Data
May 22, 2013 (EP) .................................... 13168677

(51) Int. Cl.
*H02H 3/00* (2006.01)
*H02H 1/00* (2006.01)
(Continued)

(52) U.S. Cl.
CPC .......... *H02H 1/0023* (2013.01); *H01H 83/20* (2013.01); *H02H 3/16* (2013.01);
(Continued)

(58) Field of Classification Search
USPC ...................................... 361/42–50
See application file for complete search history.

(56) References Cited

U.S. PATENT DOCUMENTS 4,067,052 A 1/1978 Neuhoff
6,229,680 B1 5/2001 Shea
(Continued)

FOREIGN PATENT DOCUMENTS

EP 2408076 A1 1/2012

*Primary Examiner* — Danny Nguyen
(74) *Attorney, Agent, or Firm* — Polsinelli PC

(57) ABSTRACT

A coil actuator for a low and medium voltage switching apparatus comprising a coil electromagnet (2), a power and control unit (3), which comprises a power circuit (31) operatively connected to said coil electromagnet (2) and a processing unit (32) operatively connected to said power circuit and controlling the trip of said coil electromagnet (2) through said power circuit (31). The power and control unit (3) comprises an optical port (30), which is suitable to be operatively connected to an optical fiber cable (112), and a first detection unit (33), which is operatively connected to said optical port and to said processing unit. The first detection unit (33) is suitable to receive a light signal (L) from said optical port and to output a first detection signal ($D_1$) indicative of the presence of an arc fault, depending on said light signal. The processing unit (32) is suitable to receive said first detection signal ($D_1$) from said first detection unit and to control the trip of said coil electromagnet (2), depending on said first detection signal. In a further aspect, the invention relates to an arc fault coil suppression device including said coil actuator.

19 Claims, 3 Drawing Sheets

(51) Int. Cl.
*H01H 83/20* (2006.01)
*H02H 3/16* (2006.01)
*H01H 83/12* (2006.01)

(52) U.S. Cl.
CPC ....... *H01H 83/12* (2013.01); *H01H 2083/201* (2013.01); *H02H 3/162* (2013.01)

(56) References Cited

U.S. PATENT DOCUMENTS

| | | | | |
|---|---|---|---|---|
| 6,657,150 B1 * | 12/2003 | Shea | ................... | H01H 3/3031 218/154 |
| 2010/0328824 A1 | 12/2010 | Roscoe | | |
| 2012/0320486 A1 * | 12/2012 | Lagree | ................. | H02H 1/0023 361/115 |

* cited by examiner

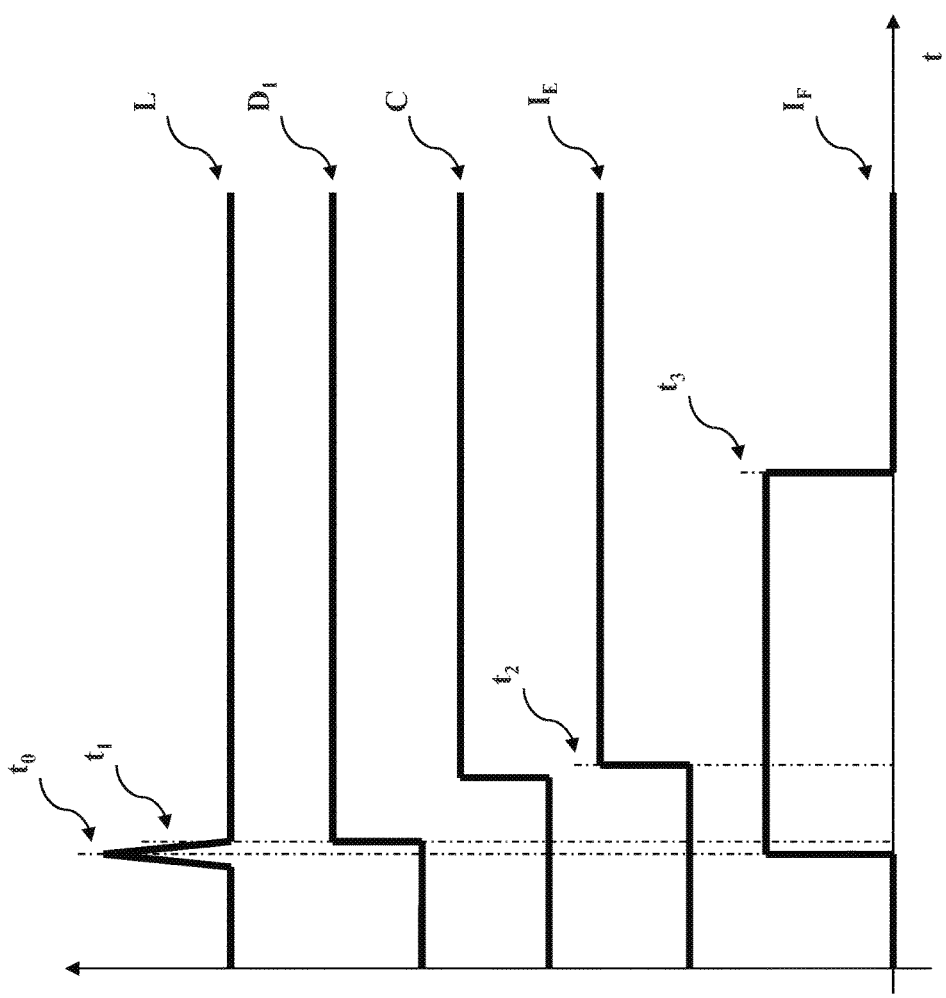

COIL ACTUATOR A FOR LOW AND MEDIUM VOLTAGE SWITCHING APPARATUS AND AN ARC FAULT COIL SUPPRESSION DEVICE COMPRISING SAID COIL ACTUATOR

The present invention relates to a coil actuator for low and medium voltage switching apparatuses, such as circuit breakers, disconnectors, contactors, reclosers or the like.

In a further aspect, the present invention relates to an arc fault coil suppression device for a low and medium voltage electrical system (such as a switching apparatus, a switchboard, a grid or the like), which comprises said coil actuator.

The coil actuator and the arc fault coil suppression device of the invention may be conveniently used in low and medium voltage applications.

Within the framework of the present invention the term "low voltage" relates to voltages lower than 1 kV AC and 1.5 kV DC while the term "medium voltage" relates to voltages lower than 72 kV AC and 100 kV DC.

As is known, arc faults are phenomena that sometimes occur between phase conductors, phase and neutral conductors or phase and ground conductors of electrical systems.

These phenomena are characterised by a rapid release of energy, which very often results in an arc flash that can produce heat, intense light, pressure waves and sound shock waves similarly to an explosion.

The occurrence of an arc fault may seriously damage the electrical system and poses serious risks to the safety of the operating personnel intervening on the electrical system.

Many solutions have been developed during years to determine the occurrence of an arc fault event and intervene on the electrical system to mitigate the arcing conditions, in particular to cut off the electrical energy supplied to the arc fault.

Some of these solutions are based on the detection of the arc flash thanks to suitable optical detection means that are positioned in the installation compartments to be observed.

Once the occurrence of an arc fault is detected, known solutions generally provide for tripping a switching apparatus to interrupt the current flow towards the flow (circuit breaking) or divert the current flow towards ground (earth switching).

In some cases, tripping commands to the switching apparatus are generated by a control a protection unit associated therewith, which is conveniently provided with an optical input port suitable to receive a light signal from the optical detection means.

In some cases, tripping commands to the switching apparatus are provided by a dedicated protection device (arc suppressor) that is specifically designed to interface with the optical detection means and process the optical detection signals therefrom, thus ensuring a faster intervention for suppressing the arc fault.

Traditional arc suppression devices are generally relatively expensive and difficult to arrange. For this reason, they are typically adopted only in electrical systems that are made available to the market at top prices.

Further, due to their intrinsic complexity, traditional arc suppression devices are often quite difficult to install in already existing electrical systems, e.g. for retrofitting purposes.

It is therefore an object of the present invention to provide an arc fault suppression arrangement for medium and low voltage electrical systems that solves the above-mentioned problems.

More in particular, it is an object of the present invention to provide an arc fault suppression arrangement that is relatively easy and low expensive to realize and install with respect to traditional solutions.

As a further object, the present invention is aimed at providing an arc fault suppression arrangement that can be conveniently installed in a wide range of electrical systems, even in electrical systems having a relatively low market price.

Still another object of the present invention is to provide an arc fault suppression arrangement that is relatively easy to install in already existing electrical systems, for retrofitting and upgrading purposes.

In order to fulfill the objects above, the present invention provides a coil actuator for a low and medium voltage switching apparatus, according to the following claim 1 and the related dependent claims.

In a further aspect, the present invention provides an arc fault coil suppression device, according to the following claim 7 and the related dependent claims.

Further characteristics and advantages of the invention will emerge from the description of preferred, but not exclusive, embodiments, non-limiting examples of which are provided in the attached drawings, wherein:

FIG. 3 is a schematic representation of the behavior of some quantities related to the operation of the coil actuator, according to the invention, in a preferred embodiment.

Figure 1:
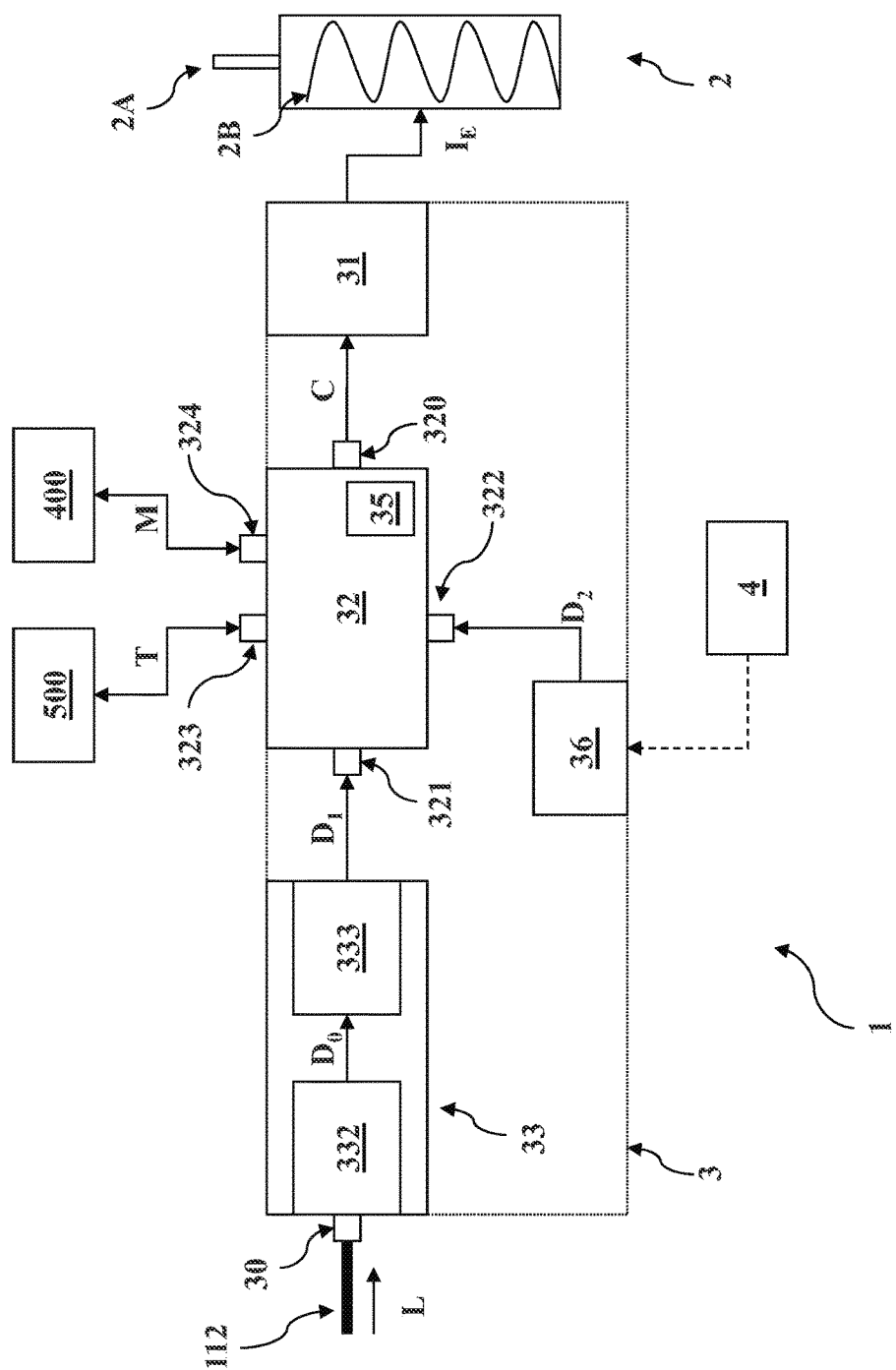
FIG. 1 is a schematic view of a general embodiment of a coil actuator, according to the invention.
Figure 2:
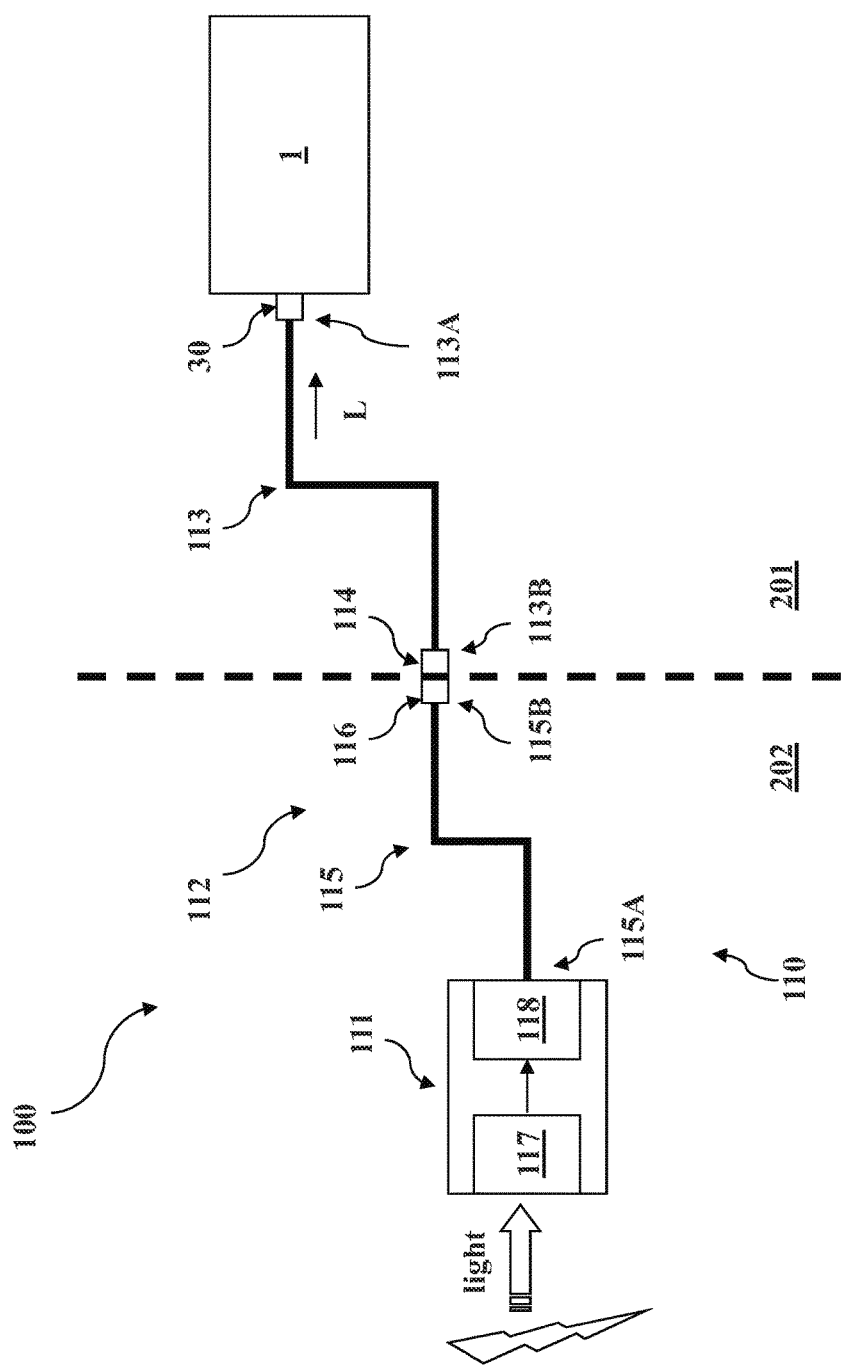
FIG. 2 is a schematic view of a general embodiment of an arc fault coil suppression device incorporating the coil actuator, according to the invention.

With reference to FIG. 1, the present invention relates to a coil actuator 1 for a low and medium voltage switching apparatus.

The coil actuator 1 is suitable to be operatively positioned in a seat of the coil actuator compartment of the switching apparatus (not shown), so as to be operatively associated with an actuation mechanism of this latter.

As an example, said switching apparatus may be a medium voltage circuit breaker and said actuation mechanism may be the primary command chain of said circuit breaker.

The coil actuator 1 comprises a casing in which a coil electromagnet 2 is housed, which comprises a coil 2B (preferably a single coil) that is operatively associated with a movable plunger 2A.

In a preferred embodiment of the present invention, the movable plunger 2A is normally in a rest position and it moves (trip event) when the coil 2B is energized by an excitation current $I_E$, since it is launched by the magnetic force generated by the coil 2B.

In another possible of the present invention, the movable plunger 2A is operatively associated with an actuating spring (not shown), so as to be moved by said actuating spring when an excitation current $I_E$, which normally circulates along the coil 2B, is interrupted.

In this case, in normal conditions, the coil 2B generates a magnetic force that opposes the mechanical force exerted by the actuating spring, which is in a compression state. The coil electromagnet 2 trips when the excitation current $I_E$ is interrupted and the movable plunger 2A is pushed by the actuating spring.

Conveniently, the casing of the coil actuator 1 has an opening that allows the movable plunger 2A of the coil electromagnet 2 to interface and interact with the actuation mechanism of the switching apparatus.

The coil actuator 1 comprises a power and control unit 3 that may positioned inside the same casing of the coil electromagnet 2 or in a different casing.

The power and control unit 3 comprises a power circuit 31 operatively connected to the coil electromagnet 2 and a processing unit 32 operatively connected to the power circuit 31.

Advantageously, the processing unit 32 comprises an output port 320, through which it sends a control signal C to the power circuit 31.

Preferably the control signal C is of the logic type. As an example, it may normally be at a low or high logic level depending on whether the processing unit 32 commands the power circuit 31 not to trip or to trip the coil electromagnet 2, respectively.

The power circuit 31 is conveniently arranged to provide the excitation current $I_E$ to the coil 2B depending on the control signal C.

If the coil electromagnet 2 is normally not supplied with the excitation current $I_E$, the power circuit 31 supplies the excitation current $I_E$ only for causing the trip of the coil electromagnet 2, when it is commanded by the processing unit 32.

If the coil electromagnet 2 is normally supplied with excitation current $I_E$, the power circuit 31 provides the excitation current $I_E$ in normal conditions and it interrupts it to cause the trip of the coil electromagnet 2, when it is commanded by the processing unit 32.

The processing unit 32 is thus always capable of controlling (control signal C) the trip of the coil electromagnet 2 through the power circuit 31.

The power and control unit 3 comprises at least an optical input port 30, which is suitable to be operatively connected to an optical fiber cable 112 to receive a light signal L, and a first detection unit 33, which is operatively connected to the optical port 30 and to the processing unit 32.

The detection unit 33 is suitable to receive the light signal L from the optical port 30 and to output a first detection signal $D_1$ indicative of the presence of an arc fault event, depending on the light signal L received in input.

Preferably, the detection unit 33 comprises identifying means operatively connected to the optical port 30 to receive the light signal L and to provide the detection signal $D_1$, as a function of said light signal.

Preferably, said identifying means comprise a photo-diode circuit 332, which is operatively coupled to the optical port 30 to receive the light signal L and to convert it in a detection current (or voltage) $D_0$ that varies as a function of the intensity of the received light signal L. The detection current $D_0$ outputted by the photo-diode circuit 332 is conveniently provided to a comparator circuit 333 for being processed.

The comparator circuit 333 compares the amplitude of the detection current $D_0$ with a predefined threshold and generates the detection signal $D_1$, depending of the result of such a comparison.

The detection signal $D_1$ is conveniently of the logic type. As an example, it may normally be at a low or high logic level depending on whether the detection current $D_0$ does not overcome or overcomes said predefined threshold, respectively.

The detection unit 33 provides the first detection signal $D_1$ to the processing unit 32, which is suitable to receive it (preferably at a first input port 321) and to control the trip of the coil electromagnet 2 by generating proper controls signal C for the power circuit 31, depending on said detection signal.

The processing unit 32 will not command the power circuit 31 to trip the coil electromagnet 2 if the detection signal $D_1$ indicates that no arc fault event is identified (e.g. the detection signal $D_1$ is at a low logic level).

The processing unit 32 will instead command the power circuit 31 to trip the coil electromagnet 2 if the detection signal $D_1$ indicates that an arc fault event is identified (e.g. the detection signal $D_1$ is at a high logic level).

The operation of the coil actuator 1, in the preferred embodiment according to which it is normally not supplied with the excitation current $I_E$, is schematically illustrated in FIG. 3.

The light signal L provided to the optical port 30 by the optical fiber cable 112 is indicative of the light radiation that is present at a given observed compartment of the switching apparatus or of the electrical system in which the switching apparatus is installed (e.g. the cable or bar compartment of the switchboard including the switching apparatus).

In normal conditions, the light signal L received at the optical port 30 does not show light pulses indicating the presence of an arc flash.

The detection unit 33 receives the light signal L and, on the base of this latter, it determines that no arc fault events are occurring.

The detection signal $D_1$ provided by the detection unit 33 thus stays at a low logic level (normal conditions).

The detection signal $D_1$ is received by the processing unit 32 that will command the power circuit 31 not to trip (control signal C at a low logic level) of the coil electromagnet 2, on the base of said detection signal.

At the instant $t_o$, an arc fault occurs at the observed compartment and an arc flash is generated.

At the same time, the current $I_F$, which supplies the arc fault, starts flowing.

The light signal L received at the optical port 30 immediately shows a pulse having remarkable intensity with respect to normal conditions.

The detection unit 33 receives the light signal L and it determines the occurrence of an arc fault event on the base of this latter.

At the instant $t_1$, the detection signal $D_1$, provided by the detection unit 33, switches to a high logic level, thereby signalling the presence of an arc fault.

The detection signal $D_1$ is received by the processing unit 32 that generates a control signal C to command (control signal C at a high logic level) the power circuit 31 to supply the excitation current $I_E$, thereby causing the trip of the coil electromagnet 2 (instant $t_2$).

The trip of the coil electromagnet 2 activates the actuation mechanism of the switching apparatus, in which the coil actuator 2 is positioned, thereby causing the interruption of the current $I_F$ that supplies the arc fault (instant $t_3$).

The interruption of the current $I_F$ causes the suppression of the arc fault.

Experimental data have shown the following typical intervention intervals for the operation of the coil actuator 1 in the preferred embodiment described above: $t_1-t_0 \approx 1$ ms, $t_2-t_0 \approx 10$ ms and $t_2-t_0 25-40$ ms.

The coil actuator 1 is thus capable of ensuring a fast intervention of the switching apparatus with improved intervention times with respect to those typical of traditional protection and control units or arc suppression devices.

Such short intervention times are quite advantageous since they allow to reduce the amount of energy provided to the arc fault, thereby remarkably mitigating the damaging effects on the electrical system.

Preferably, the power and control unit 3 is operatively connected to a power supply 4 that advantageously provides the electrical energy needed for the operation of the processing unit 32 and the power circuit 31.

Preferably, the power supply 4 constantly supplies electrical energy to the power and control unit 3, since this latter (in particular the processing unit 32 and the power circuit 31) need always to be ready to intervene with short intervention times in case of arc faults.

Preferably, the power and control unit 3 comprises a second detection unit 36 that is operatively connected to the processing unit 32.

The detection unit 36 is suitable to output a second detection signal $D_2$ indicative of the voltage level supplied to the power and control unit 3 by the power supply 4.

Preferably, the detection unit 36 comprises a voltage sensing circuit (not shown) that is operatively associated to the power supply 4 to detect the supply voltage level provided by this latter.

The processing unit 32 is suitable to receive the detection signal $D_2$ at a second input port 322 and to generate command signals C to control the trip of the coil electromagnet 2, depending on the received detection signal $D_2$.

Advantageously, the processing unit 32 processes the detection signal $D_2$ to check the actual voltage level supplied by the power supply 4.

If said voltage level is above a predefined safety threshold, the processing unit will command the power circuit 31 not to trip the coil electromagnet 2.

If said voltage level is below said safety threshold, the processing unit 32 will command the power circuit 31 to trip the coil electromagnet 2, since it is no more possible to intervene in case of arc fault events.

It is noticed that the coil actuator 1 is thus capable of performing under-voltage functionalities that are typical of the so-called under-voltage coil actuators, even in the case the coil electromagnet is normally not supplied with the excitation current $I_E$, as it occurs in under-voltage coil actuators.

Preferably, the processing unit 32 comprises a third input port 323 to receive/provide input/output data from/to an external device 500, such as a protection and control unit (e.g. the protection and control unit of the switching device in which the coil actuator 1 is incorporated).

At the port 323, the processing unit 32 may receive, for example, a tripping signal T from the external device 500 and generate a control signal C to control the trip of the coil electromagnet 2, depending on the tripping signal T, so received.

The coil actuator 1 is thus capable of performing common tripping functionalities that are typically requested to coil actuators installed in switching apparatuses.

Preferably, the processing unit 32 is a digital processing unit, such as a microprocessor, which is capable of executing software instructions to process the detection signals $D_1$, $D_2$ and the trip signal T and to generate the command signal C.

Advantageously, the processing unit 32 comprises a non-volatile and re-writable memory to store such software instructions and other operating parameters, which may be uploaded in the processing unit through a properly arranged input port (not shown).

Of course, the processing unit may comprise (not shown) further processing or electronic means to process further input data/control signals received at suitable further input ports and to provide further output data/control signals at suitable further output ports, according to the needs.

Alternative embodiments of the present invention may provide for the processing unit 32 to comprise analogue (or partially analogue) circuits to implement the functionalities described above.

Preferably, the processing unit 32 is operatively connected to an external man-machine interface (MMI) 400, which, as an example, may be comprised in the protection and control unit of the switching apparatus, in which the coil actuator 1 is included.

The processing unit 32 is thus capable to receive/provide input/output data or commands directly from/to a user, via the MMI 400.

For example, the processing unit 32 may receive a command signal M from the MMI 400 and generate a control signal C to control the trip of the coil electromagnet 2, depending on the tripping signal M, so received.

Preferably, the power and control unit 3 comprises signalling means 35 to signal a trip event of the coil electromagnet 2.

The signalling means 35 are preferably properly arranged software instructions that are executed by the processing unit 32 to provide data indicating the occurrence of a trip event of the coil electromagnet 2 to the MMI 400, which can conveniently display an alert message.

As an alternative, the signalling means 35 may be hardware implemented. For example, they may comprise a flag that is actuated by an electro-mechanical circuit (not shown) activated by the processing unit 32, by the power circuit 31 or by the coil electromagnet 2.

In a further aspect, the present invention relates to arc fault coil suppression device 100 for a low or medium voltage electrical system, such as a switching apparatus, a switchboard or another similar installation.

The suppression device 100 comprises a sensing unit 110 that is suitable to sense a light radiation and to provide a light signal L indicative of the detected light radiation.

The suppression device 100 comprises also the coil actuator 1 that is operatively connected to the sensing unit 110 at its optical port 30 to receive the light signal L.

As mentioned above, the coil actuator 1 is conveniently positioned in the coil actuator compartment 201 of a switching apparatus.

On the other hand, the sensing unit 110 may be arranged to sense the light radiation in an observed compartment 202, which may be, for example, the cable compartment or the bar compartment of an electrical system (e.g. a switchboard), in which the switching apparatus comprising the coil actuator 1 is installed, or the contact compartment of the switching apparatus itself.

Preferably, the sensing unit 110 comprises a sensing head 111 that is operatively positioned in the observed compartment 202 and an optical fiber cable 112, which is coupled to said sensing head and to the optical port 30 of the coil actuator 1.

Preferably, the sensing head 111 comprises a filter 117 of the sensed light radiation, for example a filter that is conveniently arranged to allow only the light having UV wavelengths to pass therethrough.

Preferably, the sensing head 111 comprises also a lens 118 that is operatively coupled to the output of the filter 117 to properly transmit the light signal L to the optical fiber cable 112.

In some embodiments of the present invention, the optical fiber cable 112 has a one-piece structure.

This solution is advantageously when the observed compartment 202 is relatively proximate to the compartment 201 of the switching apparatus where the coil actuator 1 is positioned.

In other embodiments of the present invention, the optical fiber cable 112 may comprise first and second portions 113, 115 that can be mutually coupled in a removable manner.

Preferably, the first portion 113 has a first end 113A coupled to the optical port 30 and a second end 113B provided with first cable connecting means 114 while the second portion 115 has a third end 115A coupled to the sensing head 111 and a fourth end 115B provided with second cable connecting means 116.

Advantageously, the first and second cable connecting means 114, 116 are mutually connectable in a removable manner.

As an example, the connecting means 114, 116 may comprise plug and socket cable connectors that can mutually couple one to another in a removable manner.

This solution is quite advantageous when relatively long distances are present between the compartments 201, 202 or when the compartments 201, 202 are mutually couplable in a removable manner, as it occurs when the coil actuator is comprised in a switching apparatus of withdrawable type, i.e. having a main body (including the compartment 201) that can be separated from a supporting frame that is permanently fixed to the electrical switchboard (including the observed compartment 202).

Preferably, the coil actuator 1 and the first portion 113 of the optical fiber cable are fixed to the compartment 201 of the switching apparatus (e.g. the coil actuator compartment) while the sensing head 111 and the second portion 115 the optical fiber cable 112 are fixed to the observed compartment 202 (e.g. the cable compartment or the bar compartment of a switchboard).

The present invention provides remarkable advantages with respect to the arc suppression arrangements of the state of the art.

The coil actuator 1 can provide the same functionalities of a control and protection unit or a dedicated arc suppression device, which therefore do not need to be installed in order to provide the switching apparatus with arc suppression functionalities.

This leads to a remarkable reduction of the manufacturing costs of the switching apparatus or the related electrical system.

The coil actuator 1 can be conveniently positioned in a seat of the coil actuator compartment of the switching apparatus.

This remarkably simplifies its installation on board the switching apparatus and it provides remarkable advantages in terms of installation flexibility for the whole suppression device 100, which can be easily set in its operative position even when the observed compartment 202 is at a relatively long distance or when the switching apparatus is of the withdrawable type, with remarkable advantages in terms of reduction of the cabling time.

The coil actuator 1 and the suppression device 100 thus may be suitably realized at relatively low cost for a large variety of electrical systems, even they are designed for relatively low price targets.

On the other hand, the coil actuator 1 can be conveniently used to replace a coil actuator that is already on board the switching apparatus.

The coil actuator 1 is capable of integrating the functionalities of a coil actuator of known type with the arc suppression functionalities, which, normally, are implemented only in protection and control units or arc suppression devices.

The suppression device 100 is thus particularly suitable to be installed on already existing electrical systems, thus making it possible a relatively low-cost and quick on-the-field upgrading of existing installations.

The invention claimed is:

1. A coil actuator for a low and medium voltage switching apparatus comprising a coil electromagnet, a power and control unit, which comprises a power circuit operatively connected to said coil electromagnet and a processing unit operatively connected to said power circuit and controlling the trip of said coil electromagnet through said power circuit, wherein said power and control unit comprises an optical port, which is suitable to be operatively connected to an optical fiber cable, and a first detection unit, which is operatively connected to said optical port and to said processing unit, said first detection unit being suitable to receive a light signal from said optical port and to output a first detection signal indicative of the presence of a arc fault, depending on said light signal, said processing unit being suitable to receive said first detection signal from said first detection unit and to control the trip of said coil electromagnet, depending on said first detection signal, wherein said control and power unit comprises a second detection unit operatively connected to said processing unit, said second detection unit being suitable to output a second detection signal indicative of the voltage level supplied to said power and control circuit, said processing unit being suitable to receive said second detection signal from said second detection unit and to control the trip of said coil electromagnet, depending on said second detection signal.

2. A coil actuator (1), according to claim 1, wherein said first detection unit comprises identifying means suitable to convert said light signal in a detection current or voltage and to process said detection current or voltage to provide said first detection signal.

3. A coil actuator, according to claim 1, which comprises a power supply that constantly supplies said power and control unit.

4. A coil actuator, according to claim 1, wherein said processing unit is suitable to receive a tripping signal from an external device and to control the trip of said coil electromagnet, depending on said tripping signal.

5. A coil actuator, according to claim 1, wherein said power and control unit comprises signalling means to signal a trip event of said coil electromagnet.

6. An arc fault coil suppression device for a low and medium voltage electrical system comprising a sensing unit to sense a light radiation and to provide a light signal indicative of the sensed light radiation which comprises a coil actuator, according to claim 1, which is operatively connected to said sensing unit at the optical port of said coil actuator to receive said light signal.

7. An arc fault coil suppression device, according to claim 6, wherein said sensing unit comprises a light sensing head and a optical fiber cable, which is operatively coupled to said sensing head and to said optical port.

8. An arc fault coil suppression device, according to claim 7, wherein said light sensing head comprises a filter of the sensed light radiation and a lens to transmit said light signal to said optical fiber cable.

9. An arc fault coil suppression device, according to claim 7, wherein said optical fiber cable comprises a first portion, which has a first end coupled to said optical port and a second end provided with a first cable connecting means, and a second portion, which has a third end coupled to said sensing head and a fourth end provided with a second cable connecting means, said first and second cable connecting means being mutually connectable in a removable manner.

10. A low and medium voltage switching apparatus which comprises a coil actuator, according to claim 1.

11. A low and medium voltage switching apparatus or electrical system which comprises an arc fault coil suppression device, according to claim 6.

12. A coil actuator, according to claim 2, which comprises a power supply that constantly supplies said power and control unit.

13. A coil actuator, according to claim 2, wherein said control and power unit comprises a second detection unit operatively connected to said processing unit, said second detection unit being suitable to output a second detection signal indicative of the voltage level supplied to said power and control circuit, said processing unit being suitable to receive said second detection signal from said second detection unit and to control the trip of said coil electromagnet, depending on said second detection signal.

14. A coil actuator, according to claim 3, wherein said control and power unit comprises a second detection unit operatively connected to said processing unit, said second detection unit being suitable to output a second detection signal indicative of the voltage level supplied to said power and control circuit, said processing unit being suitable to receive said second detection signal from said second detection unit and to control the trip of said coil electromagnet, depending on said second detection signal.

15. A coil actuator, according to claim 2, wherein said processing unit is suitable to receive a tripping signal from an external device and to control the trip of said coil electromagnet, depending on said tripping signal.

16. A coil actuator, according to claim 3, wherein said processing unit is suitable to receive a tripping signal from an external device and to control the trip of said coil electromagnet, depending on said tripping signal.

17. A coil actuator, according to claim 1, wherein said processing unit is suitable to receive a tripping signal from an external device and to control the trip of said coil electromagnet, depending on said tripping signal.

18. A coil actuator, according to claim 2, wherein said power and control unit comprises signalling means to signal a trip event of said coil electromagnet.

19. A coil actuator, according to claim 3, wherein said power and control unit comprises signalling means to signal a trip event of said coil electromagnet.

* * * * *